(12) United States Patent
Movsesian et al.

(10) Patent No.: US 6,702,230 B2
(45) Date of Patent: Mar. 9, 2004

(54) BALLISTIC RESISTANT FLIGHT DECK DOOR ASSEMBLY HAVING VENTILATION FEATURE

(75) Inventors: Sami Movsesian, Glendale, CA (US); Stephen A. Wiles, Los Alamitos, CA (US); Dinanath Gharmalkar, Fountain Valley, CA (US); Behrooz Afghani, Huntington Beach, CA (US); Jerry D. Smets, Orange, CA (US); Eisen Kaoru Inouye, Cypress, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/162,450

(22) Filed: Jun. 4, 2002

(65) Prior Publication Data
US 2003/0222175 A1 Dec. 4, 2003

(51) Int. Cl.[7] ............................................... B64D 11/00
(52) U.S. Cl. ................................ 244/118.5; 244/129.5
(58) Field of Search .......................... 244/129.4, 129.5, 244/118.5, 119; 109/68; 49/21, 31, 171, 463

(56) References Cited

U.S. PATENT DOCUMENTS

| | | | |
|---|---|---|---|
| 1,026,207 A | * | 5/1912 | Johnson |
| 3,704,845 A | * | 12/1972 | Ord .......................... 244/118.5 |
| 4,390,152 A | | 6/1983 | Jorgensen |
| 4,899,960 A | | 2/1990 | Hararat-Tehrani et al. |
| 5,195,701 A | | 3/1993 | Willan |
| 5,645,184 A | | 7/1997 | Rowse et al. |
| 6,264,141 B1 | | 7/2001 | Shim et al. |
| 6,336,293 B1 | | 1/2002 | Kamimura |
| 6,474,599 B1 | * | 11/2002 | Stomski ..................... 244/118.5 |
| 2003/0047648 A1 | * | 3/2003 | Batt et al. ................. 244/118.5 |
| 2003/0052227 A1 | * | 3/2003 | Pittman ..................... 244/118.5 |
| 2003/0066930 A1 | * | 4/2003 | Pratt et al. ................ 244/118.5 |

* cited by examiner

Primary Examiner—Galen L. Barefoot
(74) Attorney, Agent, or Firm—Harness Dickey & Pierce P.L.C.

(57) ABSTRACT

A ballistic resistant flight deck door assembly for an aircraft is disclosed that also enables pressure equalization within the aircraft in the event of a sudden loss of cabin pressure within the flight deck or cabin. The door assembly includes a door having a plurality of spaced apart panels of ballistic material and a honeycomb support panel. A ventilation area is formed in the door by a plurality of apertures in each of the ballistic panels that are arranged such that no two apertures of the two ballistic panels are perfectly aligned with each other. The blowout panel and ventilation area therefore allows airflow through the door to help equalize pressure within the flight deck in the event of a loss of depressurization of the flight deck without compromising the door's ability to provide ballistic protection for the occupants in the flight deck.

21 Claims, 2 Drawing Sheets

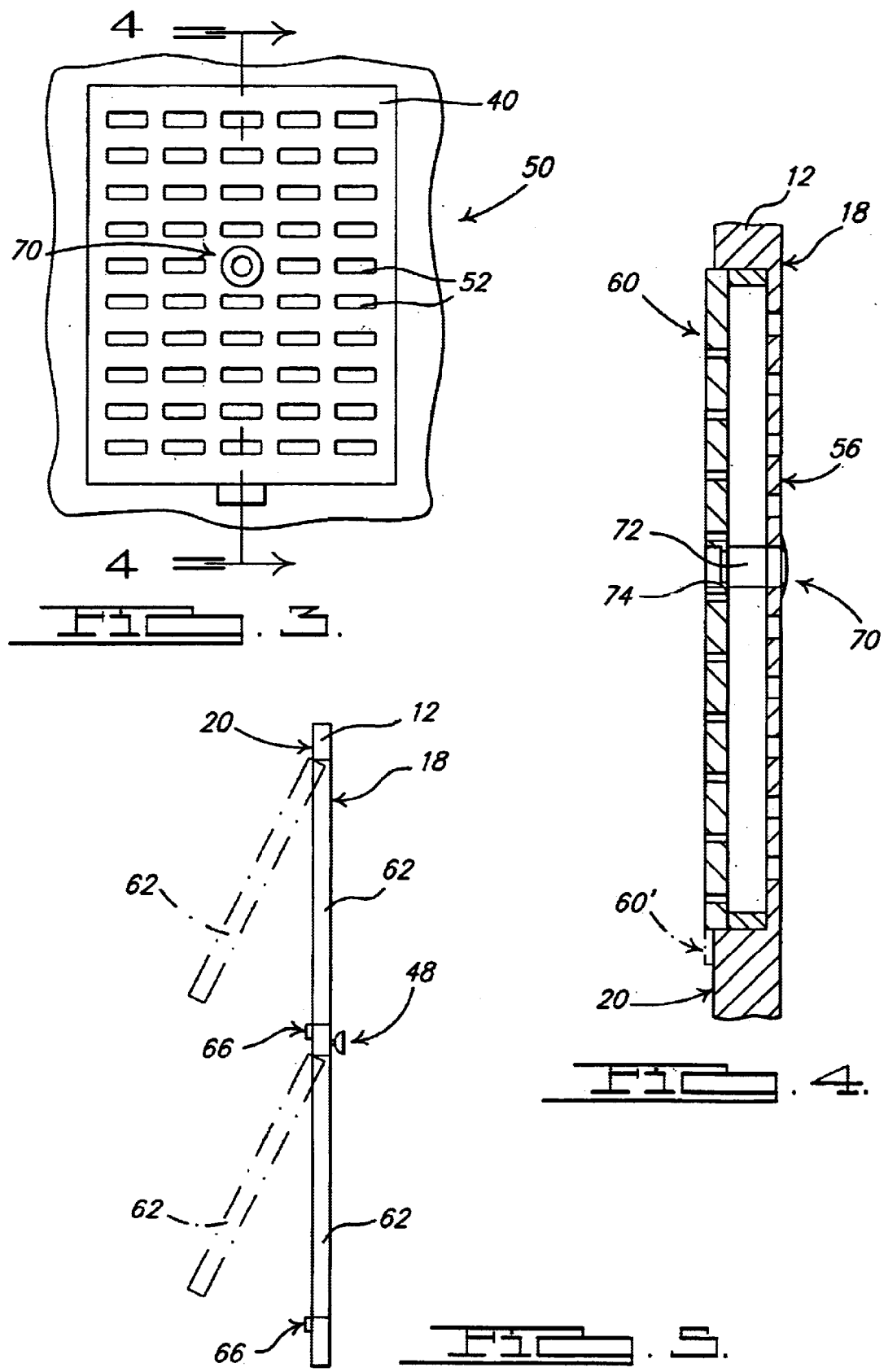

BALLISTIC RESISTANT FLIGHT DECK DOOR ASSEMBLY HAVING VENTILATION FEATURE

FIELD OF THE INVENTION

The present invention relates to flight deck doors and more particularly to ballistic and intrusion resistant doors in a commercial aircraft.

BACKGROUND OF THE INVENTION

The Federal Aviation Administration (FAA) has issued new requirements for flight deck doors of commercial aircraft to meet new ballistic and intrusion criteria. The flight deck door of most commercial aircraft provides for ventilation and pressure equalization between the flight deck and passenger cabin. Some abnormal events, such as a windshield break due to a bird strike at cruising altitude, result in a decompression of the aircraft. The internal structure of many commercial aircraft may be seriously stressed by significant pressure differences between the separate compartments. These compartments, such as the flight deck, cabin and avionics compartment are separated by floor, wall and ceiling panels and doors which can be attached to the air frame. Ventilation and blowout panels can be located between separate areas of an aircraft to allow for rapid pressure equalization of these areas to reduce stresses on the air frame as a result of aircraft depressurization.

Typical prior art devices for pressure equalization between compartments of a commercial aircraft utilize grill openings and blowout doors, such as disclosed in commonly assigned U.S. Pat. No. 5,069,401, Compartment Partition and Pressure Relief Door Therefore, and U.S. Pat. No. 6,129,312, Aircraft Decompression Vent Assembly. While these devices have proved to be effective for their intended purposes, they nevertheless were not designed to meet the stringent, present ballistic and intrusion requirements.

Flight deck doors of many commercial aircraft are installed separately from the door frame pieces. A ballistic and intrusion resistant door will necessitate installation of a door frame that can withstand the same initiating events as the door design. Conventional doors and frames for a commercial aircraft are low frequency failure items and are rarely replaced. Mandated replacement of all flight deck doors of commercial aircraft would require an excessive amount of aircraft down time if conventional installation practices were used. A modular frame/hinge/door/latch unit could be installed in less time than required to install these components separately.

Therefore, the need exists for a ballistic and intrusion resistant door between the passenger cabin and flight deck of a commercial aircraft that has an integrated ventilation area with a modular construction that allows for rapid change out.

SUMMARY OF THE INVENTION

Further areas of applicability of the present invention will become apparent from the detailed description provided hereinafter. It should be understood that the detailed description and specific examples, while indicating one or more preferred embodiments of the invention, are intended for purposes of illustration only and are not intended to limit the scope of the invention.

The present invention is directed to a ballistic and intrusion resistant door to protect pilots from an attack during flight. As will be described, a ballistic resistant material is included in the construction of a flight deck door. This material strengthens the overall door structure thus providing for additional stiffness and intrusion protection.

In another aspect of the present invention, the door has larger dimensions than, and overlaps, its associated door frame when closed to reduce any susceptibility to prying. The door opens toward the passenger cabin to provide additional intrusion protection and, thus provided, can significantly limit the possibility of being kicked or forced open.

The improved door can be provided as part of a modular unit including a frame, hinge, locking mechanism and provisions for installation. In this manner, the modular unit can be readily installed (i.e., retro fitted into existing aircraft) to limit aircraft down time.

In yet another aspect of the present invention, a ventilation area with a blowout panel is integrated into the improved door to provide for pressure equalization on either side of the door. This ventilation area utilizes ballistic resistant materials that are positioned so as to permit air flow through the flight deck door while maintaining the desired ballistic and intrusion resistant characteristics. A smoke cover can be provided for the ventilation area to lessen the effectiveness of a gas attack and to lessen smoke penetration in the flight deck in the event of a cabin fire.

DETAILED DESCRIPTION OF THE DRAWINGS

The present invention will become more fully understood from the detailed description and the accompanying drawings, wherein:

FIG. 3 is a plan view of the ventilation area of the door of FIG. 1;

FIG. 4 is a cross-sectional view of the ventilation panel of FIG. 3 taken in accordance with section line 4—4 in FIG. 3; and FIG. 5 is a side view of the door of FIG. 1.

DETAILED DESCRIPTION OF THE PREFERRED EMBODIMENTS

The following description of the preferred embodiment(s) is merely exemplary in nature and is in no way intended to limit the invention, its application, or uses.

Figure 1:
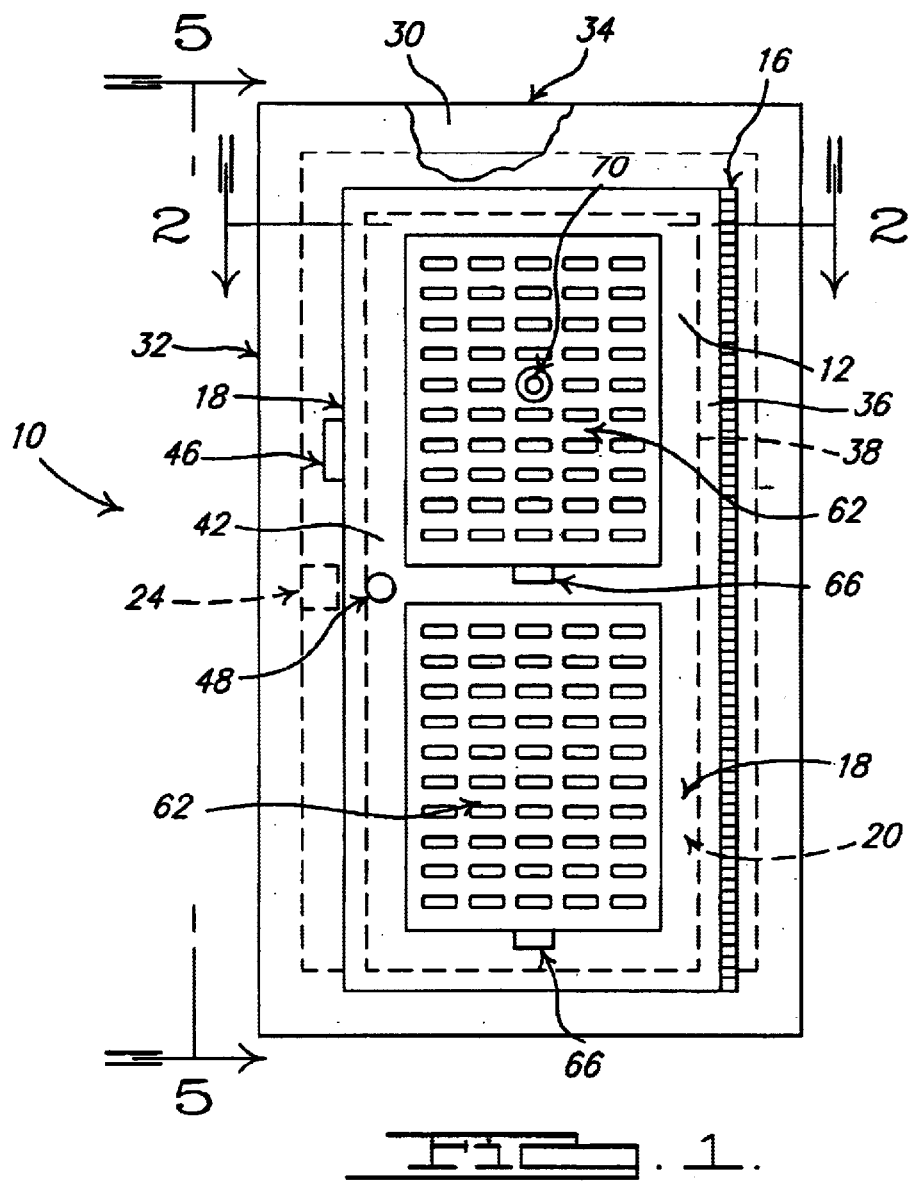
FIG. 1 is a plan view of the flight deck door assembly in accordance with a preferred embodiment of the present invention.
Figure 2:
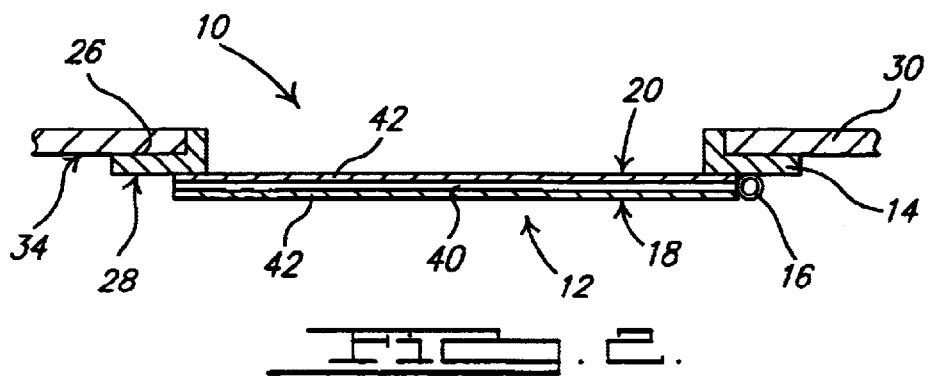
FIG. 2 is an cross-sectional view of the door assembly of FIG. 1, taken in accordance with section line 2—2 in FIG. 1.

With reference to FIGS. 1 and 2, a flight deck door assembly 10 in accordance with a preferred embodiment of the present invention is shown. The door assembly 10 includes a door 12 that is attached to a frame 14 by a hinge 16. Hinge 16 is shown attached to the door 12 near a peripheral edge 18 of door 12. As best seen in FIG. 2, door 12 includes a front side 20 and a rear side 22. The door assembly 10 further includes a solenoid latch 24 used to secure the door 12 against unauthorized access from the rear side 22, or cabin side, of door 12.

With specific reference to FIG. 2, frame 14 includes a first side 26 and a second side 28. Frame 14 is secured to an aircraft door jamb 30 using screws or other conventional attachment means. Preferably an external peripheral edge 32 of frame 14 contacts a peripheral edge 34 of the aircraft door jamb 30. Door 12 is shown to further include an overlapping region 36 that contacts the second side 28 of frame 14. Preferably, overlapping region 36 extends about the entire peripheral edge 18 of door 12, as indicated by dashed lines 38 in FIG. 1.

Ballistic resistant material 40 is shown in FIG. 2 between door panels 42. Ballistic resistant material 40 may preferably comprise Spectra® or Kevlar® ballistic resistant material of a thickness sufficient to comply with FAA requirements. It will be appreciated that other suitable ballistic resistant materials could just as well be employed.

Door panels 42 are preferably comprised of an aluminum skin or an aluminum honeycomb structure with an outer sheet of aluminum. It will be appreciated that other materials of suitable strength could also be employed. Ballistic resistant material 40 is attached to door panel 42 using fasteners, adhesive, or other conventional attachment means. In an alternate embodiment, door 12 can be constructed entirely of ballistic resistant material 40.

With further reference to FIG. 1, solenoid latch 24 can be manually released from the flight deck or front side 20 or activated by a signal sent from a conventional encrypted keypad 46 located in the cabin or rear side 22 of door assembly 10. Doorknob 48 is shown attached to rear side 22 of door 12. Doorknob 48 is adapted in a preferred embodiment for pulling door 12 and has no unlocking capability. Ventilation areas 50 are shown in a preferred location integrated into the upper and lower portion of door 12.

With reference to FIGS. 3 and 4, ventilation area 50 is shown to include apertures 52 within ballistic resistant material 40. Preferably, two distinct layers 56 form the ballistic resistant material 40 are provided with each having apertures 52. Apertures 52 are positioned (i.e., overlayed) such that at least one thickness of layer 56 remains as the ballistic resistant material 40 layers 56 are aligned. The layers 56 of ballistic resistant material 40 are spaced apart to permit airflow through apertures 52 and ventilation area 50. In this manner, ventilation area 50 provides ballistic protection due to the overlap of the layers 56 of ballistic resistant material 40. While fifty apertures are disclosed in FIG. 3, it will be appreciated that a greater or lesser number of apertures 52 could be provided to accomplish the needed ventilation function. Additionally, It will be appreciated that more than two layers 56 of ballistic resistant material 40 could be provided and aligned as needed.

With specific reference to FIG. 4, a smoke cover 60 (shown as 60' when closed) is located on front side 20 of door 12 and is provided to limit the flow of any gases and fumes from the passenger cabin into the flight deck. In a preferred embodiment, smoke cover 60 is manually opened and closed from the flight deck compartment.

Referring to FIGS. 1 and 5, door 12 is shown in a preferred embodiment including at least one blowout panel 62. Blowout panel 62 can be a single piece of ballistic resistant material 40 or a layering of ballistic resistant material 40 and door panels 42, but preferably includes a ventilation area 50 having apertures 52 as described herein. Blowout panel 62 is provided to disengage from door 12 in the event of a large pressure differential between the flight deck and cabin. In this manner, blowout panel can be opened by the force resulting from the differential air pressure between the cabin and flight deck, providing a larger passageway for air flow. Blowout panel 62 is preferably provided with a panel hinge 64 interconnecting blowout panel 62 to door 12. Thus provided, blowout panel 62 can rotate relative to door 12. In this manner, blowout panel 62 is less likely to impact equipment or personnel when disengaging from door 12. It should be recognized that while blowout panel 62 is shown in FIG. 5 rotating toward the flight deck, panel hinge 64 can be configured to allow blowout panel 62 to rotate toward the flight deck or cabin or both.

With continuing reference to FIG. 5, panel latch 66 is adapted to secure blowout panel 62 to door 12. Panel latch 66 is configured to allow blowout panel 62 to rotate when a large pressure differential exists between the flight deck and cabin. Panel latch 66 can be manually released from the flight deck.

With reference to FIGS. 1, 3 and 4, one preferred embodiment of door assembly 10 includes a peephole 70. Peephole 70 is preferably located in an upper portion of door 12 and can be located within a ventilation area 50 and/or a blow out panel 62. Peephole 70 has a construction that includes a ballistic resistant but transparent glass element 72 and an aluminum retainer 74 for supporting the element 72 in the door 12.

The present invention thus provides a door assembly that provides a significant degree of ballistic and intrusion resistance. Additionally, the door assembly provides a ventilation area and blowout panel to allow for pressure equalization between aircraft compartments in the event of a rapid decompression in an aircraft during flight.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A modular door assembly comprising:

a door panel;

an external frame formed, to at least partially surround a portion of a periphery of the door panel;

a hinge that pivotally connects said door panel to said frame;

a ballistic resistant material covering a portion of the door panel; and a ventilation area formed in the door panel.

2. The modular door assembly of claim 1, further comprising a latch that secures the door panel to the frame.

3. The modular door assembly of claim 1, wherein said hinge comprises a single continuous hinge.

4. The modular door assembly of claim 1, wherein said ballistic resistant material includes Spectra® ballistic resistant woven material.

5. The modular door assembly of claim 1, wherein said ballistic resistant material includes Kevlar® ballistic resistant woven material.

6. The modular door assembly of claim 1, wherein said latch includes a solenoid.

7. The modular door assembly of claim 5, wherein said solenoid is adapted for activation by a security coded device.

8. The modular door assembly of claim 1, wherein a peripheral edge of said door panel overlaps at least a portion of an internal peripheral edge of said external frame.

9. The modular door assembly of claim 1, wherein an external peripheral edge of said external frame overlaps at least a portion of an inner peripheral edge of a door jamb associated with said external frame.

10. The modular door assembly of claim 1, wherein said ventilation area further comprises:

a plurality of layers of said ballistic resistant material positioned such that selected pairs of said layers overlay one another;

apertures formed within each of said layers; and said layers of said ballistic resistant material further being positioned such that said apertures of said adjacently positioned layers are not aligned.

11. The modular door assembly of claim 1, further comprising a blowout panel, said blowout panel adapted to releaseably disengage from the door upon application of a predetermined force.

12. The blowout panel of claim 11, further comprising a hinge adapted to constrain the constrain the movement of said blowout panel relative to said door.

13. The blowout panel of claim 12, further comprising a latch adapted to secure said blowout panel relative to said door.

14. The modular door assembly of claim 1, further comprising a smoke cover.

15. A door assembly for an interior area of an aircraft, the door assembly comprising:

at least first and second layers of ballistic resistant material positioned such that they overlay one another;

said layers further forming a ventilation area comprised of a plurality of apertures formed in each of said layers;

said apertures further being positioned such that said apertures formed in said first layer do not overlay said apertures formed in said second layer.

16. The modular door assembly of claim 15, wherein said smoke cover is located in the flight deck side of a flight deck door.

17. The door assembly of claim 15, further comprising a blowout panel.

18. The door assembly of claim 17, further comprising a latch adapted to secure said blowout panel relative to said door.

19. A door assembly for providing resistance to ballistic projectiles while allowing ventilation of an area adjacent to said door assembly, said door assembly comprising:

a first layer of ballistic resistant material having a first plurality of apertures;

a second layer of ballistic resistant material having a second plurality of apertures;

a support panel adjacent to at least one of said first and second layers of ballistic resistant material;

said first and second pluralities of apertures being laterally offset from one another such that no pair of said apertures completely overlays one another, said apertures providing a ventilation area for said door assembly without compromising said resistance to ballistic projectiles.

20. The door assembly of claim 19, further comprising a blowout panel.

21. The door assembly of claim 19, wherein said support panel comprises a honeycomb structure and is interposed between said first and second ballistic resistant layers.

* * * * *